(12) United States Patent
Matsuzawa

(10) Patent No.: US 7,810,600 B2
(45) Date of Patent: Oct. 12, 2010

(54) MOTORCYCLE WITH INTAKE DUCT FOR BELT CHAMBER ARRANGED BETWEEN SEAT AND REAR FENDER

(75) Inventor: Torao Matsuzawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 216 days.

(21) Appl. No.: 11/741,653

(22) Filed: Apr. 27, 2007

(65) Prior Publication Data

US 2007/0251744 A1 Nov. 1, 2007

(30) Foreign Application Priority Data

Apr. 28, 2006 (JP) .............................. 2006-125796
Mar. 30, 2007 (JP) .............................. 2007-095127

(51) Int. Cl.
F16H 57/04 (2010.01)
B62M 7/12 (2006.01)

(52) U.S. Cl. ....................... 180/229; 180/230; 180/68.1; 180/339; 474/93

(58) Field of Classification Search ................. 180/229, 180/219, 230, 231, 68.1, 68.2, 339; 474/93, 474/146; 74/606 A
See application file for complete search history.

(56) References Cited

U.S. PATENT DOCUMENTS

| | | | | |
|---|---|---|---|---|
| 4,402,379 A | * | 9/1983 | Hoshi | 180/225 |
| 4,531,928 A | * | 7/1985 | Ikenoya | 474/93 |
| 4,632,070 A | * | 12/1986 | Onda et al. | 123/41.58 |
| 4,634,108 A | * | 1/1987 | Munch | 267/279 |
| 4,733,639 A | * | 3/1988 | Kohyama et al. | 123/198 E |
| 5,044,646 A | * | 9/1991 | Iiga et al. | 180/219 |
| 5,101,924 A | * | 4/1992 | Yamagiwa et al. | 180/220 |
| 5,222,572 A | * | 6/1993 | Yamagiwa et al. | 180/220 |
| 5,478,098 A | * | 12/1995 | Akagi et al. | 180/68.3 |
| 5,644,202 A | * | 7/1997 | Toriyama et al. | 318/369 |
| 6,073,948 A | * | 6/2000 | Motojima et al. | 280/152.2 |
| 6,164,673 A | * | 12/2000 | Matsuura | 280/124.101 |
| 6,572,089 B2 | * | 6/2003 | Zietsch | 267/220 |
| 2006/0270503 A1 | * | 11/2006 | Suzuki et al. | 474/144 |

FOREIGN PATENT DOCUMENTS

| | | | | |
|---|---|---|---|---|
| JP | 63130429 A | * | 6/1988 |
| JP | 05330470 A | * | 12/1993 |
| JP | 09328088 A | * | 12/1997 |
| JP | 10-218062 | | 8/1998 |
| JP | 2000-079892 | | 3/2000 |
| JP | 2000229593 A | * | 8/2000 |
| JP | 2003054468 A | * | 2/2003 |

OTHER PUBLICATIONS

AIPN machine translation and Derwent abstract of Kurata, JP 2000-079892, 9 pages.*

* cited by examiner

Primary Examiner—Lesley Morris
Assistant Examiner—Wesley Potter
(74) Attorney, Agent, or Firm—Keating & Bennett, LLP

(57) ABSTRACT

A motorcycle has a duct that is simple in construction to introduce cooling air into a belt chamber while simultaneously preventing invasion of dust, etc. into the belt chamber. A rear fender defines a wall that separates the seat and a rear tire. An outside-air intake port of the duct is arranged in a space formed between the seat and the wall.

19 Claims, 11 Drawing Sheets

MOTORCYCLE WITH INTAKE DUCT FOR BELT CHAMBER ARRANGED BETWEEN SEAT AND REAR FENDER

RELATED APPLICATIONS

This application claims the benefit of priority under 35 USC 119 of Japanese patent application no. 2006-125796, filed on Apr. 28, 2006, and Japanese patent application no. 2007-095127, filed on Mar. 30, 2007, which applications are hereby incorporated by reference in their entireties.

BACKGROUND OF THE INVENTION

1. Field of the Invention

The present invention relates to a motorcycle, and more particularly to a motorcycle provided with a duct through which air is led to a belt chamber.

2. Description of Related Art

Some motorcycle transmissions use a V-belt, which is simple in construction and inexpensive. Since a V-belt may slip when dust and sludge adhere thereto, the V-belt is accommodated in a belt chamber to prevent adherence of dust, sludge, etc. thereto. However, the V-belt generates heat due to friction with a drive pulley at the time of running, which decreases the V-belt in durability. And, when the V-belt is accommodated in a belt chamber, heat works, so that the V-belt is increased in temperature even more.

In order to solve the problem, cooling devices are known that introduce outside air into a belt chamber to decrease temperature in the belt chamber. For example, JP-A-10-218062 and JP-A-2000-79892 disclose such cooling devices.

JP-A-10-218062 provides a clean room below a low foot put base arranged forwardly of a belt chamber, and an outside-air intake port of an intake duct is formed in the clean room. However, since the outside-air intake port is arranged in a low position of the vehicle body and in the vicinity of a front wheel, the internal construction of the clean room must be complex in order to prevent invasion of dust that is splashed by the front wheel.

JP-A-2000-79892 provides a transmission case bearing a V-belt wrapping mechanism and an air cleaner arranged above the transmission case to purify outside air. The outside air for cooling the transmission case is introduced from the air cleaner. However, since the outside-air intake port of the air cleaner is arranged just above a rear wheel, dust splashed by the rear wheel is mixed with the air sucked into the intake port, making it necessary to frequently perform maintenance of the air cleaner.

Thus, in the related art, the peripheral construction of the intake duct must be complex in order to prevent dust and sludge splashed by front and rear wheels from entering the belt chamber, or to be able to take in outside air through the air cleaner without the requirement of frequent cleaning.

SUMMARY OF THE INVENTION

The invention addresses these issues and provides a motorcycle that is simple in construction and prevents invasion of dust, etc. into a belt chamber.

The invention provides a motorcycle having a rear tire arranged below the seat, and a belt chamber that accommodates a belt for transmission of driving force to the rear tire. A duct introduces outside air into the belt chamber. A wall is provided below the seat to separate the seat and the rear tire, and an outside-air intake port of the duct is arranged in a space formed between the seat and the wall.

In one embodiment, a side cover is arranged below the seat, and a side of the outside-air intake port is covered by the side cover.

In another embodiment, an engine is mounted outside the space formed between the seat and the wall.

In a further embodiment, a body frame extending in a longitudinal direction of the motorcycle is arranged below the seat, and the engine and the outside-air intake port are partitioned by the body frame.

In a further embodiment, the outside-air intake port is opened downward.

In a further embodiment, a fuel tank is arranged below the seat, and the outside-air intake port is opened toward the fuel tank.

In a further embodiment, a cover filler is formed above the outside-air intake port and covers a side of the fuel tank.

In a further embodiment, the duct has an elliptical cross-section that is lengthy in a longitudinal direction of the motorcycle.

In a further embodiment, the duct includes a bellows having an elliptical cross-section that is lengthy in a longitudinal direction of a vehicle.

In a further embodiment, a rear fender is provided above the rear tire and extends toward the front of a vehicle to define the wall that separates the seat and the rear tire.

In a further embodiment, a swing arm is mounted to the body frame and supports the rear tire. An interlocking member moves with the swing arm and extends through a through-hole in the rear fender. A sealing member is formed around the through-hole.

In a further embodiment, the interlocking member is a bellows formed on the duct, and the sealing member covers a tip end of the bellows and closes the through-hole.

In a further embodiment, the sealing member is made of an elastic material, and the interlocking member is a rear cushion interposed between the swing arm and the body frame.

According to the invention, since a wall is provided below the seat to separate the seat and a rear tire, and since an outside-air intake port of a duct, through which an outside air is introduced into a belt chamber, is arranged in a space formed between the seat and the wall, dust and sludge that are splashed by the rear tire are prevented from being sucked into the outside-air intake port. Accordingly, invasion of dust, etc. into the belt chamber is prevented, with the result that a stable operating state of the belt is maintained.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 5(*b*) is a side view of the neighborhood of the duct; and FIG. 5(*c*) is a cross-sectional view taken along line Vc-Vc of FIG. 5(*b*).

DETAILED DESCRIPTION OF THE INVENTION

An embodiment of the invention is now described with reference to the drawings. The invention is not limited to the following embodiment.

Figure 1:
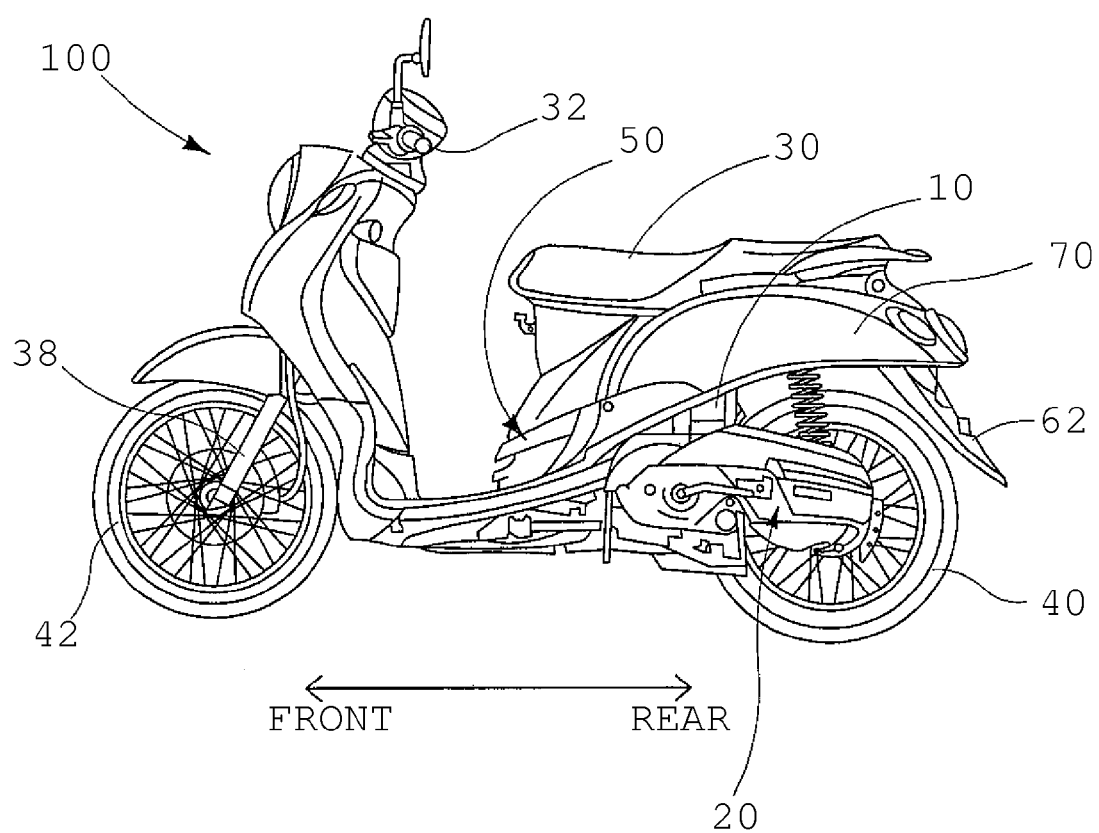
FIG. 1 is a side view of a motorcycle according to an embodiment of the invention.

A motorcycle 100 according to the embodiment of the invention is illustrated in FIG. 1. Motorcycle 100 includes a seat 30, a handle 32, a front tire 42, a rear tire 40 and an engine 50.

Seat 30 is arranged centrally in a longitudinal direction of a vehicle body and handle 32 is forward of seat 30. A front fork 38 extending forwardly and downwardly from handle 32 supports front tire 42. A manipulating force applied by a rider to handle 32 is transmitted to front tire 42 via front fork 38. A traveling direction of motorcycle 100 is determined by changing a direction of front tire 42.

Engine 50 is below seat 30 and rear tire 40 is rearward of engine 50. A belt (not shown) interposed between engine 50 and rear tire 40 transmits power generated by engine 50 to drive rear tire 40. The belt is a V-belt used as a continuously variable transmission and is accommodated in a belt chamber 20 for protection from dust and sludge. A duct 10 is formed above belt chamber 20 to conduct outside air to belt chamber 20.

Figure 2:
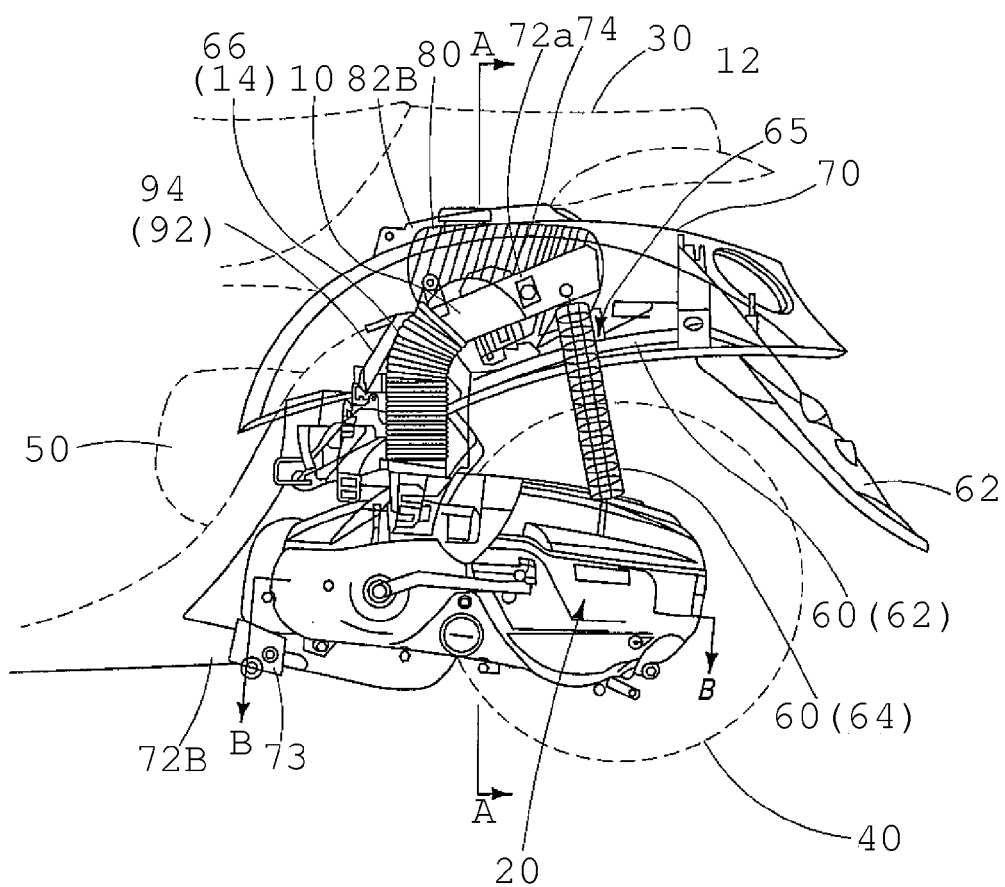
FIG. 2 is a partial, enlarged view of the motorcycle with a part of a side cover cut away and illustrating essential parts in a neighborhood of a duct.

The construction of duct 10 is described with reference to FIG. 2. FIG. 2 shows essential parts of a neighborhood of duct 10 with a portion of side cover 70 cut away, and illustrates the positional relation of duct 10, side cover 70, belt chamber 20 and rear fender 62.

Seat 30 is arranged in a topmost position of FIG. 2 and rear tire 40 is below seat 30. Rear tire 40 is driven by engine 50 (see FIG. 1) arranged below seat 30 and the substantially rectangular-shaped belt chamber 20 extending in the longitudinal direction of the vehicle body is formed rearwardly of engine 50. The rear of belt chamber 20 is connected to and supports rear tire 40. As mentioned above, a V-belt accommodated in belt chamber 20 transmits a driving force of engine 50 to rear tire 40. The V-belt varies a speed reducing ratio according to rotation of engine 50 to transmit power to a wheel of rear tire 40.

Duct 10 is a hose-shaped member that projects upward from a front, upper surface of belt chamber 20 and conducts outside air to belt chamber 20. Duct 10 as configured has an inverted J-shape. An outside-air intake port 12 is opened to the inverted J-shaped tip end to suck air into duct 10. Air sucked into intake port 12 passes through duct 10 and is conducted to an interior of belt chamber 20. Intake port 12 is arranged in a space 35 formed between seat 30 and a wall 60, which separates seat 30 and rear tire 40, provided below seat 30.

Thus, intake port 12 is partitioned from rear tire 40 by wall 60, which prevents dust and sludge splashed by rear tire 40 from being sucked into intake port 12. In turn, dust, etc. cannot enter belt chamber 20, and belt slippage due to adhesion of dust, etc., is thereby avoided and a stable operating state of the belt is maintained.

Figure 3:
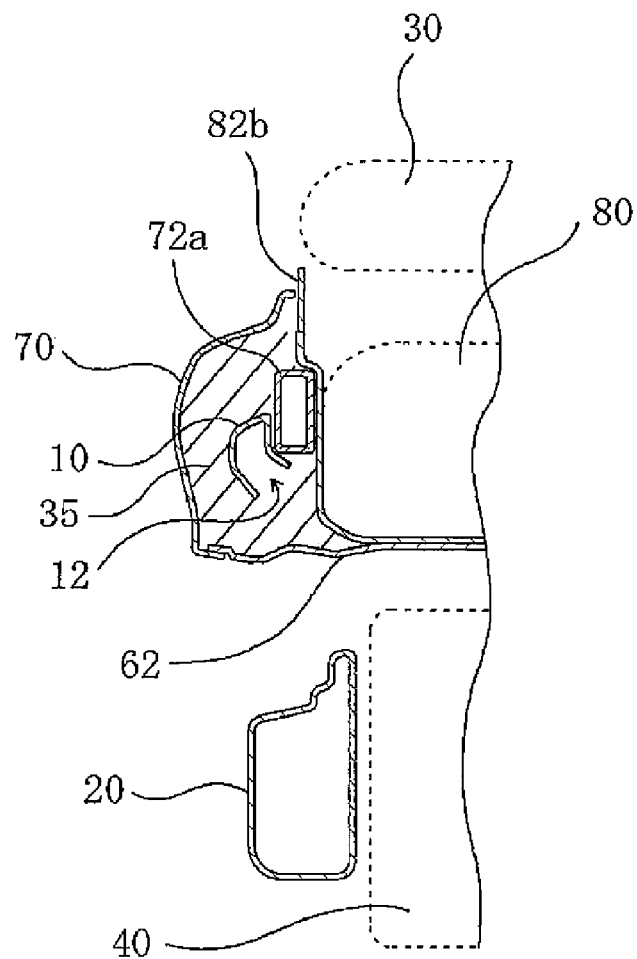
FIG. 3 is a cross-sectional view taken along line III-III of FIG. 2.

Duct 10 is described in further detail with reference to FIG. 3. Duct 10 is arranged leftwardly and downwardly of seat 30 in the traveling direction. A portion 72a of a body frame 72 is laterally inward of duct 10, and extends obliquely downward in a longitudinal direction of the vehicle body toward the front of the vehicle body from the rear thereof. Duct 10 is fixed to an outer side of body frame 72a by a nut 74 (FIG. 2).

A fuel tank 80 is arranged inside body frame 72a and a pair of left and right side covers 70 are mounted below seat 30 in a manner to cover left and right sides of fuel tank 80, body frame 72a and duct 10. Side covers 70 protect electrical equipment, etc. arranged below seat 30 and have a curved shape projecting in a vehicle width direction. Instead of being arranged just below seat 30, side covers 70 may be arranged in positions offset from just below seat 30 in the vehicle width direction. Side covers 70 cover sides of intake port 12 formed at the tip end of duct 10.

A rear fender 62 is mounted rearwardly and downwardly of side covers 70, and rearwardly and upwardly of rear tire 40, to prevent dust and sludge splashed by rear tire 40 from being scattered. Rear fender 62 is not only arranged rearwardly and upwardly of rear tire 40, but also extends to the front of the vehicle body in a manner to cover substantially the whole lower surfaces of side covers 70 to define wall 60. Intake port 12 of duct 10 is formed in space 35 surrounded by rear fender 62 and side covers 70 (FIG. 3).

Figure 4:
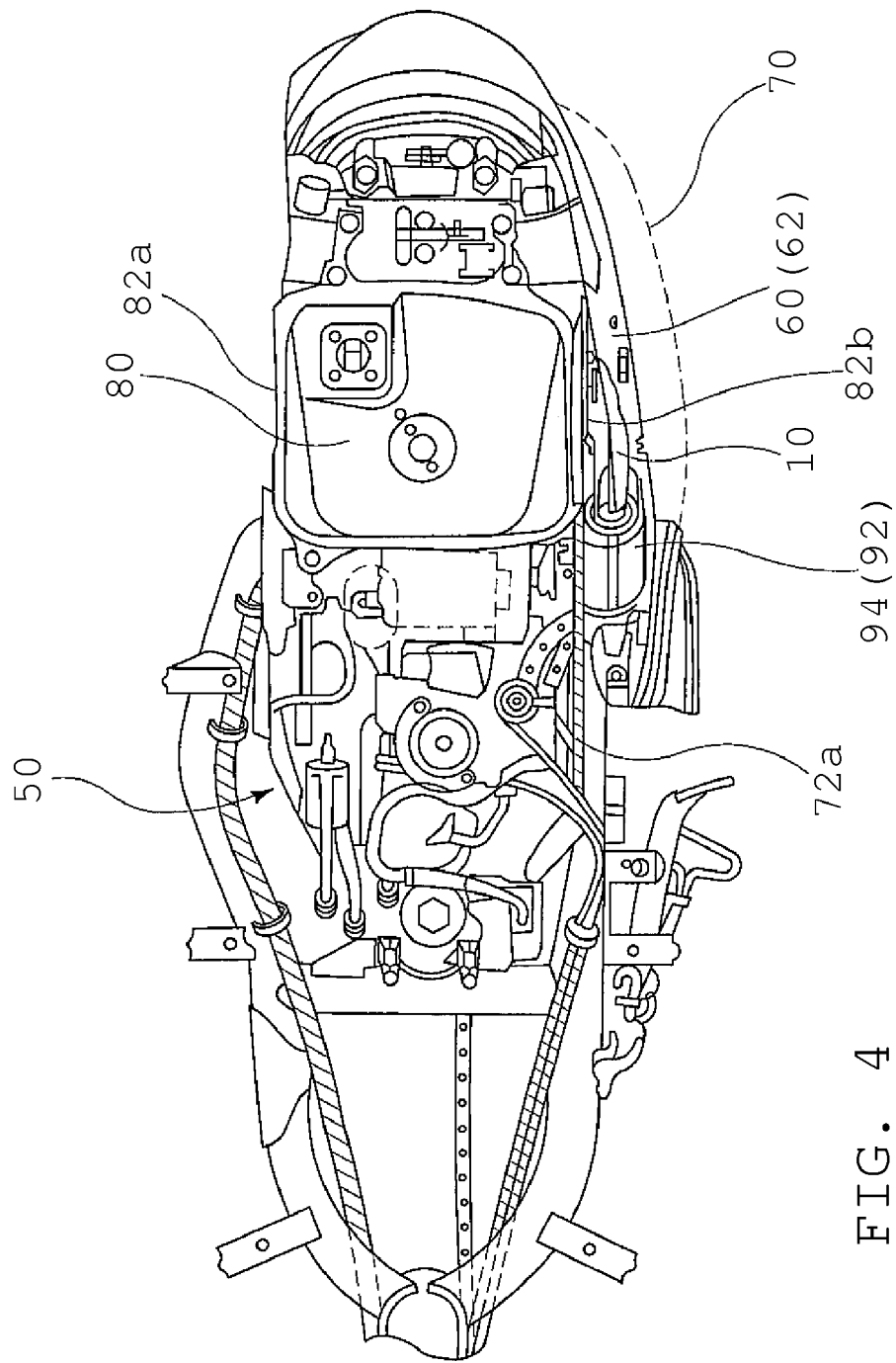
FIG. 4 is a top view of the motorcycle showing the neighborhood of the duct and added electrical equipment.

FIG. 4 is a top view of motorcycle 100 showing the neighborhood of duct 10 and electrical equipment, etc. arranged below seat 30. Seat 30, which is lengthy in the longitudinal direction of the vehicle body, is omitted from FIG. 4 for simplification. Engine 50 is mounted forwardly and downwardly of seat 30. Fuel tank 80 is arranged rearwardly and downwardly of seat 30.

A muffler (not shown) is arranged laterally rightward of fuel tank 80 and a cover filler 82a is interposed between the muffler and fuel tank 80. Cover filler 82a is a substantially rectangular-shaped member that extends along a right side of fuel tank 80 and projects above an upper surface of fuel tank 80. Cover filler 82a prevents fuel from flowing toward the muffler even when fuel leaks from fuel tank 80. A cover filler 82b also extends along a left side of fuel tank 80 and projects above the upper surface of fuel tank 80 (see FIG. 3). Duct 10 is mounted to a left side of cover filler 82b.

Body frame 72a is interposed between fuel tank 80 and duct 10 in the longitudinal direction of the vehicle body and extends forwardly and downwardly of the vehicle body and laterally of engine 50. Body frame 72a partitions engine 50 and duct 10 from each other. While body frame 72a is interposed between and partitions engine 50 from duct 10, body frame 72a may be arranged in a manner to define both. Where engine 50 and duct 10 are to be partitioned from each other, a space between both can be further separated.

Figure 5A:
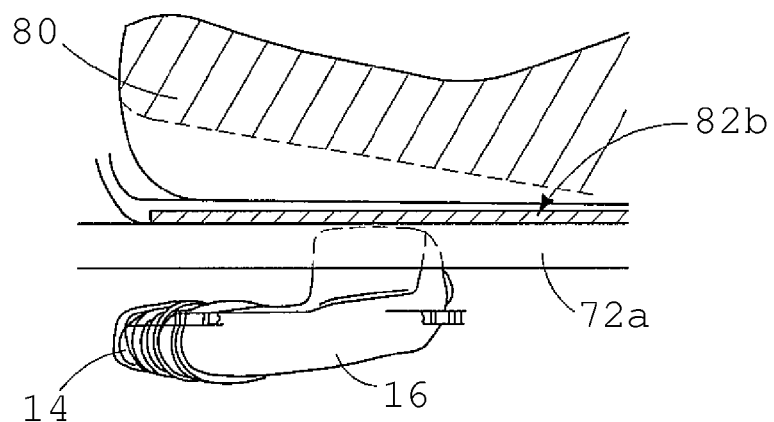
FIG. 5(*a*) is a top view of the neighborhood of the duct.
Figure 5B:
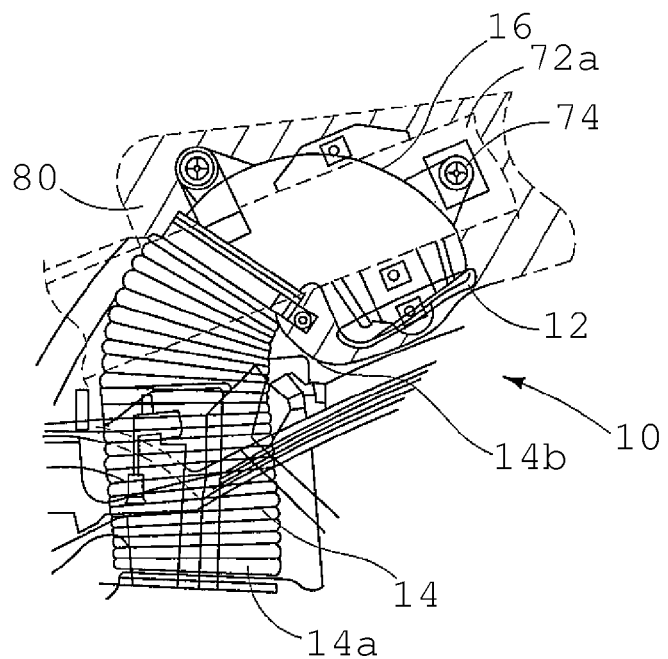
Figure 5C:

FIGS. 5(a)-(c) are enlarged views showing essential parts of duct 10. As described above, duct 10 projects above the upper surface of belt chamber 20 and has an inverted J-shape. The inverted J-shaped configuration is a combination of a bellows 14 and an inverted U-shaped member 16. Bellows 14 is a hose-shaped member made of an elastic material and has a cross-section in the form of an ellipse that is lengthy in the longitudinal direction of the vehicle body as shown in FIG. 5(c). A lower end 14a of bellows 14 is mounted to an upper surface of belt chamber 20 while an upper end 14b thereof is connected to an end of inverted U-shaped member 16.

Inverted U-shaped member 16 is made of a resin material and is formed with intake port 12 at an end opposite to the end connected to bellows 14. As shown in FIG. 5(b), intake port 12 is bent in an inverted U-shaped manner to be opened downwardly of the vehicle body. As shown in FIG. 5(a), which is a top view of duct 10 and adjacent features, a tip end portion of inverted U-shaped member 16 is twisted inside the vehicle body and extends underneath body frame 72a, so that intake port 12 is opened toward fuel tank 80. Outside air sucked from intake port 12 passes through inverted U-shaped member 16 and elliptical-shaped bellows 14 to be led to belt chamber 20.

Figure 6A:
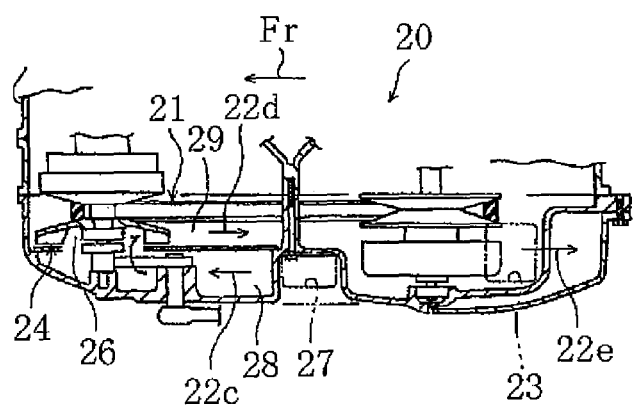
FIG. 6(a) is a cross-sectional view of a belt chamber of the motorcycle taken along line VI-VI of FIG. 2.
Figure 6B:
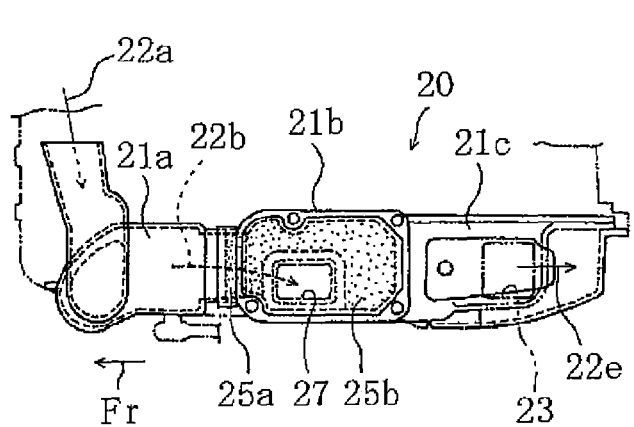
FIG. 6(b) is a plan view showing an interior of the belt chamber.

Flow of outside air led to belt chamber 20 is described with reference to FIGS. 6(a) and 6(b). When motorcycle 100 runs, a fan 24 arranged in belt chamber 20 is driven to put a suction portion 26 around fan 24 in negative pressure, so that outside air 22a in the vicinity of a front case 21a is sucked into front case 21a. Outside air 22b sucked into front case 21a passes successively through a filter 25a and a filter 25b for dust collection and purification. The purified air 22b rises in intermediate case 21b and then is sucked downward into an outside-air flow port 27.

An outside air 22c sucked into outside-air flow port 27 passes through an outside-air introduction passage 28 to be sucked into suction portion 26 of fan 24. Then, outside air 22c is given a velocity of flow by blades of fan 24 to pass through an outside-air flow passage 29 to be directed toward an outside-air discharge port 23. At this time, V-belt 21 is air-cooled by outside air 22d, which passes through outside-air flow passage 29. Outside air 22e passing through outside-air discharge port 23 to be discharged outside belt chamber 20 is conducted to a rear case 21c to be discharged outside from a rear, lower portion of belt chamber 20.

As shown in FIG. 2, belt chamber 20 accommodates therein a power system including the V-belt and journals rear tire 40 rotatably inside the rear portion of belt chamber 20. A front end of belt chamber 20 is pivotally supported on a portion 72b of body frame 72 provided forwardly of belt chamber 20 through a frame pivot portion 73 to be able to swing vertically, with belt chamber 20 itself serving as a swing arm of rear tire 40.

A rear cushion 64 projects upward from a rear, upper side of belt chamber 20, and an upper end of rear cushion 64 is fixed to portion 72a of the body frame above rear tire 40 by a nut and suspends and supports belt chamber (swing arm) 20. Rear cushion 64 comprises a coil spring and a damper. Shocks applied to rear tire 40 are absorbed by telescopic motion of rear cushion 64 and vertical fluctuation of belt chamber 20.

Figure 7A:
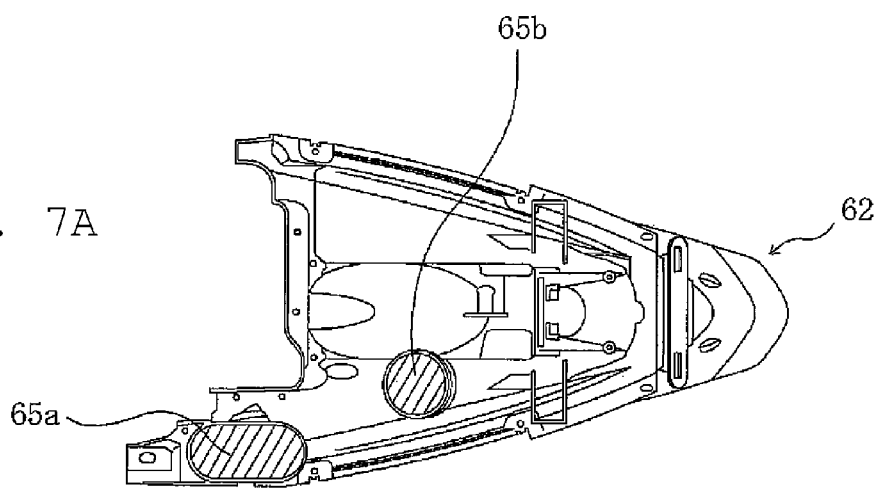
FIGS. 7(a) and (b) are, respectively, top and side views of a rear fender of the motorcycle.
Figure 7B:
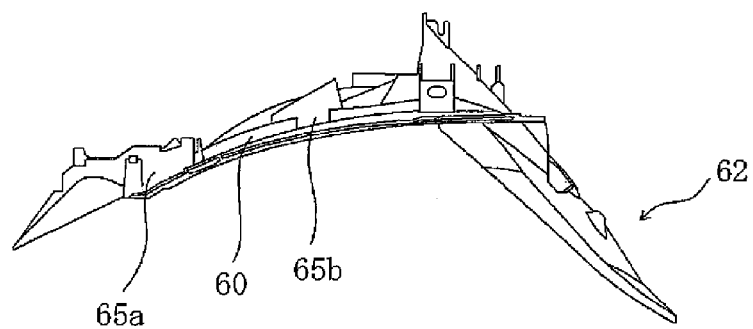

FIGS. 7(a) and (b) depict rear fender 62, which extends to the front of the body frame in a manner to cover undersides of side covers 70 and forms wall 60, which separates seat 30 and rear tire 40. As shown in FIG. 7(a), which is a top view, two through-holes 65a and 65b are formed on the left of rear fender 62 in the traveling direction. Through-hole 65a is in the form of an ellipse that is lengthy in the longitudinal direction of the vehicle body, while through-hole 65b is circular. Members 66 (i.e. duct 10 and rear cushion 64), which interlock when belt chamber 20 (swing arm) swings vertically, extend through through-holes 65 (see FIGS. 8 and 9). Bellows 14 of duct 10 projects upward from the front, upper surface of the belt chamber 20 and extends through through-hole 65a, while rear cushion 64 projects upward from the rear, upper side of belt chamber 20 and extends through through-hole 65b. Since interlocking members 66 are subject to movement while extending through through-holes 65, inside diameters of through-holes 65 are larger than outside diameters of interlocking members 66.

Figure 8:
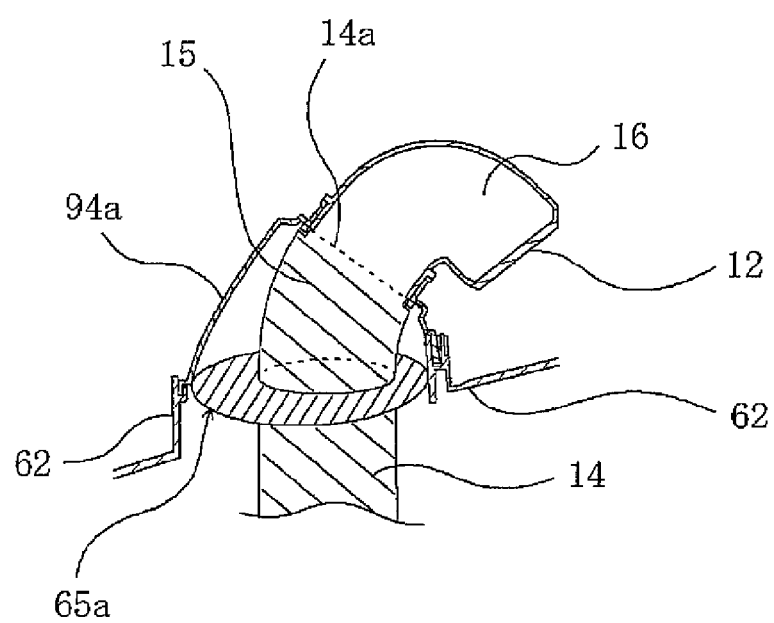
FIG. 8 is a cross-sectional view showing a state in which a bellows of the duct 10 extends through a through-hole, as viewed from the left of the motorcycle.
Figure 9:
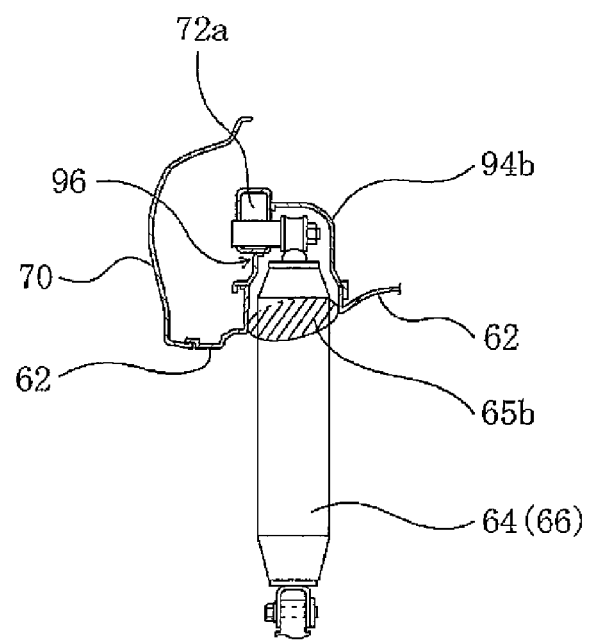
FIG. 9 is a cross-sectional view showing a state in which a rear cushion extends through a through-hole, as viewed from the rear of the motorcycle.

FIGS. 8 and 9 depict interlocking members 66 extending through through-holes 65. FIG. 8 shows bellows 14 extending through through-hole 65a, as viewed from the left of the vehicle body. FIG. 9 shows rear cushion 64 extending through through-hole 65b, as viewed from the rear of the vehicle body.

Sealing members 94 are provided in through-holes 65. As shown in FIG. 8, an upper end 15 of bellows 14 projecting from the upper surface of belt chamber 20 is inserted through a cylindrical-shaped sealing member 94a and a periphery thereof is covered by sealing member 94a. A lower, opened cross section of sealing member 94a is larger than an opened shape of through-hole 65a and a lower end of sealing member 94a is fixed to rear fender 62 along an outer edge, which defines through-hole 65a. Accordingly, sealing member 94a fills a clearance between bellows 14 and rear fender 62.

Figure 10A:
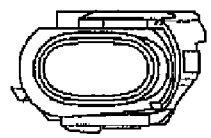
FIGS. 10(a)-(c) are, respectively, top, side and bottom views of an example of a sealing member of the motorcycle.
Figure 10B:
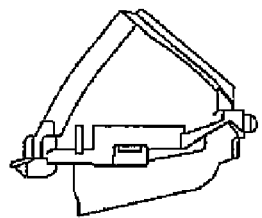
Figure 10C:
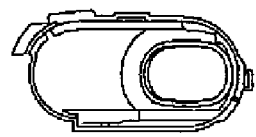

FIGS. 10(a)-(c) depict sealing member 94a, which is made of an elastic material. An opened section of an upper end of sealing member 94a is substantially the same as an opened, cross sectional shape of bellows 14 while an opened section of a lower end thereof is substantially the same as an opened shape of through-hole 65a.

As shown in FIG. 9, sealing member 94b provided in through-hole 65b is in the form of an inverted cup. Its lower end is fixed to rear fender 62 along an outer edge, which defines through-hole 65b. A hole 96 is formed on an upper side of the inverted cup shape. An upper end of rear cushion 64 extends through through-hole 65b and is inserted into sealing member 94b of the inverted cup shape to be fixed through hole 96 to body frame 72a within side covers 70. Surplus clearance in hole 96 is filled by body frame 72a and fuel tank 80 (not shown in FIG. 9), and sealing member 94b fills the clearance between rear cushion 64 and rear fender 62.

Figure 11A:
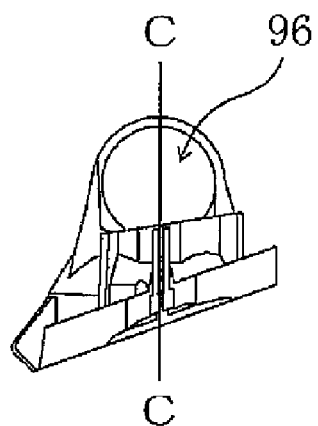
FIG. 11(a) is a side view of an example of a sealing member.
Figure 11B:
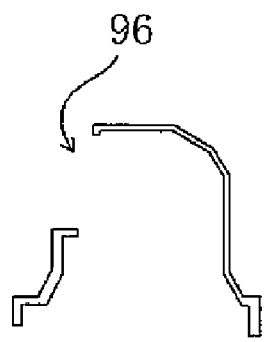
FIG. 11(b) is a cross sectional view of the sealing member taken along line C-C of FIG. 11(a)
Figure 11C:
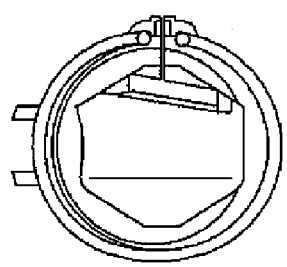
FIG. 11(c) is a bottom view of the sealing member.

FIGS. 11(a)-(c) depict sealing member 94b, which is made of an elastic material. An opened section of a lower end of sealing member 94b is substantially the same as an opened shape of through-hole 65b.

Since intake port 12 at the tip end of duct 10 is arranged in a space formed between rear fender 62, which extends to the front of the vehicle body, and seat 30, dust and sludge splashed by rear tire 40 are prevented from being sucked through intake port 12. Since intake port 12 is formed in a high position on the vehicle body, air intake is made from a space in which there is little dust, etc.

Further, the sides of intake port 12 are covered by side covers 70. Thus, intake port 12 is arranged in a highly closed space surrounded by side covers 70 and rear fender 62, reliably preventing invasion of dust, etc. Since air intake is made from a space that is large in volume and small in air flow, sucking of dust, etc. is further suppressed In this manner, a very simple duct construction prevents invasion of dust, etc. into belt chamber 20 with the result that belt slippage due to adhesion of dust, etc., is avoided and a stable operating state of the belt is maintained. Since clean outside air is sucked, it is not necessary to frequently wash filter 25b provided in belt chamber 20. Maintenance time and cost is thereby reduced.

In addition, since wall 60 formed between seat 30 and rear tire 40 is integral with rear fender 62, it is unnecessary to prepare a separate member for formation of wall 60, which reduces parts and costs.

Also, since intake port 12 is arranged in a space partitioned from engine 50 by body frame 72a, air intake is removed from outside air that is heated by engine 50, with the result that the cooling effect produced by duct 10 is increased.

Japanese Patent Application No. 57-5836 discloses a cooling device in which an outside-air suction port is opened to a space surrounded by a body cover and a seat, but is different from the present invention in that the outside-air suction port is not arranged in a space between the seat and a wall formed between the seat and a rear tire. Also, in contrast to the present invention, since the outside-air suction port is formed in a position relatively close to an engine, the cooling effect is decreased.

Also, intake port 12 in the embodiment is opened downwardly of the vehicle body. Accordingly, even when rainwater enters side covers 70 in rainy weather, it is possible to avoid entrance into intake port 12.

Since intake port 12 is opened toward fuel tank 80, which needs to be maintained at a low temperature, the cooler air around fuel tank 80 is sucked into intake port 12, thereby increasing the cooling effect produced by duct 10.

Since cover filler 82*b* is mounted between intake port 12 of duct 10 and fuel tank 80, fuel that leaks from fuel tank 80 is not sucked into duct 10.

Since duct 10 includes a flexible bellows 14, motion of belt chamber (swing arm) 20 is accommodated while a ventilation flue is ensured. Outside air is stably sucked from intake port 12 by fixing the tip end of duct 10 to body frame 72*a*, thereby improving the quality of outside air suction.

Since the opened section of bellows 14 is in the form of an ellipse that is lengthy in the longitudinal direction of the vehicle body, bellows 14 smoothly follows the swinging motion of belt chamber 20 while making the vehicle body slim by reducing its widthwise dimension. However, bellows 14 is not limited to an elliptical shape and may be other shapes, such as a deformed ellipse, provided that it is longer in the longitudinal direction of the vehicle than in the width direction.

Since clearances between interlocking members 66 (bellows 14 and rear cushion 64) extending through throughholes 65 of rear fender 62 and rear fender 62 are closed by sealing members 94 (sealing members 94*a*, 94*b*), the space 35 surrounded by side covers 70 and rear fender 62 is further closed in, so that dust, etc. is prevented from entering space 35 in which intake port 12 is arranged. Further, since sealing members 94 are made of an elastic material, smooth motion of interlocking members 66 is guaranteed.

While an embodiment of the invention has been described in the context of a scooter, the invention is not limited thereto. "Motorcycle" in the specification includes a bicycle with a prime mover, and indicates a vehicle that is turned by a handle. Accordingly, vehicles such as three-wheelers, four-wheelers and so on, are included in "motorcycle".

While embodiments of the invention have been described, such description is not limitative and various modifications are possible.

According to the invention, a motorcycle is provided that is simple in construction and that prevents invasion of dust, etc. into a belt chamber.

The invention claimed is:

1. A motorcycle comprising:
    a seat;
    a fuel tank arranged below the seat;
    a body frame extending in a longitudinal direction of the motorcycle and arranged below the seat;
    a rear tire arranged below the seat;
    a belt chamber that accommodates a belt for transmission of driving force to the rear tire;
    a duct that introduces outside air into the belt chamber; and
    a wall defined by a rear fender arranged below the seat that separates the seat and the rear tire; wherein
    an upper portion of the duct is attached to the body frame;
    an outside-air intake port of the duct is arranged in a space defined between the seat and the wall and opens toward the fuel tank;
    the outside-air intake port is arranged at a position higher than a lower surface of the fuel tank; and
    the outside-air intake port extends downward and toward the fuel tank.

2. The motorcycle according to claim 1, and further comprising:
    a side cover arranged below the seat, wherein a side of the outside-air intake port is covered by the side cover.

3. The motorcycle according to claim 1, and further comprising:
    an engine mounted outside the space defined between the seat and the wall.

4. The motorcycle according to claim 3, wherein the engine and the outside-air intake port are partitioned by the body frame.

5. The motorcycle according to claim 1, wherein the outside-air intake port opens downward.

6. The motorcycle according to claim 5, and further comprising:
    a cover filler arranged above the outside-air intake port, wherein the cover filler covers a side of the fuel tank.

7. The motorcycle according to claim 1, wherein the duct has an elliptical cross-section having a longer dimension in a longitudinal direction of the motorcycle.

8. The motorcycle according to claim 1, wherein the duct includes a bellows having an elliptical cross-section having a longer dimension in a longitudinal direction of the motorcycle.

9. The motorcycle according to claim 8, wherein the duct has an inverted J-shape, the duct defined by the bellows and an inverted U-shaped member attached to a top end of the bellows.

10. The motorcycle according to claim 9, wherein a lower end of the bellows is mounted to the belt chamber, and the outside-air intake port is defined by the U-shaped member at an end opposite to an end attached to the bellows.

11. The motorcycle according to claim 1, wherein the rear fender is provided above the rear tire and extends toward a front of the motorcycle.

12. The motorcycle according to claim 11, and further comprising:
    a swing arm mounted to the body frame and supporting the rear tire; and
    an interlocking member that moves with the swing arm and extends through a through-hole in the rear fender; and
    a sealing member arranged around the through-hole.

13. The motorcycle according to claim 12, wherein
    the interlocking member includes the duct, and
    the duct further includes a bellows, and
    the sealing member covers a tip end of the bellows and closes the throughhole.

14. The motorcycle according to claim 12, wherein the sealing member is made of an elastic material, and
    the interlocking member includes a rear cushion interposed between the swing arm and the body frame.

15. The motorcycle according to claim 12, wherein the swing arm includes the belt chamber.

16. The motorcycle according to claim 15, wherein the interlocking member includes the duct extending through the through-hole in the rear fender between the swing arm and the body frame, and further comprising:

another interlocking member defined by a rear cushion that extends between the swing arm and the body frame.

17. A method for introducing cooling air into a belt chamber of a motorcycle, the method comprising the steps of:

forming an enclosed space between a seat and a rear fender of the motorcycle;

providing an air duct that extends from the belt chamber and that has an air intake port positioned in the enclosed space; and attaching an upper portion of the air duct to a body frame of the motorcycle such that the air intake port is arranged to face a fuel tank of the motorcycle; wherein in the attaching step, the air intake port is arranged at a position higher than a lower surface of the fuel tank and extends downward and toward the fuel tank.

18. The method according to claim 17, and further comprising:

providing side covers to further define the enclosed space.

19. The method according to claim 17, and further comprising:

partitioning the air duct from an engine of the motorcycle so that heated air from the engine is not introduced into the air duct.

* * * * *